United States Patent
Tani et al.

(10) Patent No.: US 12,269,495 B2
(45) Date of Patent: Apr. 8, 2025

(54) VEHICLE APPROACH NOTIFICATION SYSTEM AND VEHICLE APPROACH NOTIFICATION METHOD

(71) Applicant: Panasonic Intellectual Property Management Co., Ltd., Osaka (JP)

(72) Inventors: Mitsuhiro Tani, Osaka (JP); Shinnosuke Nagasawa, Osaka (JP); Fumiyasu Konno, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 17/944,455

(22) Filed: Sep. 14, 2022

(65) Prior Publication Data

US 2023/0098125 A1    Mar. 30, 2023

(30) Foreign Application Priority Data

Sep. 29, 2021    (JP) .................... 2021-159521

(51) Int. Cl.
*B60W 50/14*    (2020.01)
*B60W 40/04*    (2006.01)
(Continued)

(52) U.S. Cl.
CPC ............ *B60W 50/14* (2013.01); *B60W 40/04* (2013.01); *H04R 1/2803* (2013.01);
(Continued)

(58) Field of Classification Search
CPC ......... B60W 50/14; B60W 2050/0052; B60W 2050/0083; H04R 1/2803; H04R 2499/13; H04R 3/04

See application file for complete search history.

(56) References Cited

U.S. PATENT DOCUMENTS

| | | | | |
|---|---|---|---|---|
| 2007/0257783 A1* | 11/2007 | Matsumoto | ............ | B60Q 1/506 340/426.25 |
| 2012/0166042 A1* | 6/2012 | Kokido | .................. | B60Q 5/008 701/36 |

(Continued)

FOREIGN PATENT DOCUMENTS

| | | | | |
|---|---|---|---|---|
| DE | 102012020780 A1 * | 4/2014 | ............ | B60Q 5/008 |
| JP | 2020-152335 | 9/2020 | | |

(Continued)

OTHER PUBLICATIONS

Office Action from Japan Patent Office (JPO) in Japanese Patent Appl. No. 2021-159521, dated Jul. 9, 2024, together with an English language translation.

(Continued)

*Primary Examiner* — Rufus C Point
(74) *Attorney, Agent, or Firm* — Greenblum & Bernstein, P.L.C.

(57) ABSTRACT

A vehicle approach notification system includes a filter; a notification sound controller which generates a signal corresponding to a notification sound for notifying of approaching of a vehicle, based on a sound signal obtained from a notification-sound sound source; and a setter which obtains vehicle information of the vehicle, and sets, according to the vehicle information, at least one of the notification-sound sound source to be used in generation of the notification sound, a filter property to be applied to the filter, or a control parameter to be applied to the notification sound controller in generation of the notification sound. The notification sound controller outputs the signal generated, through the filter to an exterior loudspeaker provided to the vehicle.

19 Claims, 9 Drawing Sheets

(51) Int. Cl.
   *B60W 50/00* (2006.01)
   *H04R 1/28* (2006.01)
(52) U.S. Cl.
   CPC ............... *B60W 2050/0052* (2013.01); *B60W 2050/0083* (2013.01); *B60W 2050/143* (2013.01); *H04R 2499/13* (2013.01)

(56) References Cited

U.S. PATENT DOCUMENTS

| | | | |
|---|---|---|---|
| 2013/0009768 A1* | 1/2013 | Terao | B06B 1/0207 340/463 |
| 2014/0056438 A1* | 2/2014 | Baalu | B60Q 5/008 381/86 |
| 2015/0049877 A1 | 2/2015 | Horie | |
| 2020/0215969 A1* | 7/2020 | Konno | B60R 11/02 |
| 2020/0238902 A1* | 7/2020 | Pyzik | B60Q 5/008 |
| 2020/0314540 A1 | 10/2020 | Konno et al. | |

FOREIGN PATENT DOCUMENTS

| | | |
|---|---|---|
| JP | 2020-161991 | 10/2020 |
| WO | 2013/145187 | 10/2013 |

OTHER PUBLICATIONS

Office Action from Japan Patent Office (JPO) in Japanese Patent Appl. No. 2021-159521, dated Oct. 1, 2024, together with an English language translation.

* cited by examiner

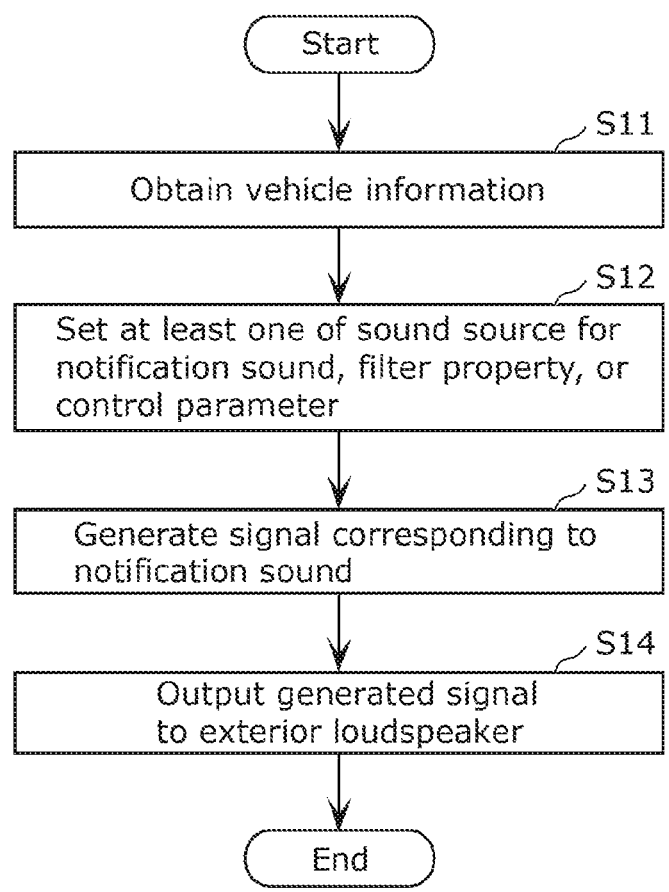

VEHICLE APPROACH NOTIFICATION SYSTEM AND VEHICLE APPROACH NOTIFICATION METHOD

CROSS REFERENCE TO RELATED APPLICATION

The present application is based on and claims priority of Japanese Patent Application No. 2021-159521 filed on Sep. 29, 2021.

FIELD

The present disclosure relates to a vehicle approach notification system and a vehicle approach notification method for outputting a sound for notifying an outside of a vehicle about approaching of the vehicle.

BACKGROUND

Electric vehicles and hybrid vehicles are silent, and therefore it is difficult to notice their approaching. For this reason, silent vehicles such as electric vehicles and hybrid vehicles include a device which warns a pedestrian and the like about approaching of a vehicle by outputting a sound reminding of a driving vehicle (also referred to a notification sound) during driving of the vehicle (see Patent Literature (PTL) 1, for example).

CITATION LIST

Patent Literature

PTL 1: Japanese Patent Application Laid-Open No. 2020-161991

SUMMARY

However, the device disclosed in PTL 1 can be improved upon.

In view of this, the present disclosure provides a vehicle approach notification system and the like capable of improving upon the above related art.

The vehicle approach notification system according to one aspect of the present disclosure includes a filter; a notification sound controller which generates a signal corresponding to a notification sound for notifying of approaching of a vehicle, based on a sound signal obtained from a notification-sound sound source; and a setter which obtains vehicle information of the vehicle, and sets, according to the vehicle information, at least one of the notification-sound sound source to be used in generation of the notification sound, a filter property to be applied to the filter, or a control parameter to be applied to the notification sound controller in generation of the notification sound. Here, the notification sound controller outputs the signal generated, through the filter to an exterior loudspeaker provided to the vehicle.

The vehicle approach notification system according to one aspect of the present disclosure includes a notification sound controller which generates a signal corresponding to a notification sound for notifying of approaching of a vehicle, based on a sound signal obtained from a notification-sound sound source, and outputs the signal generated to an exterior loudspeaker provided to the vehicle. Here, the vehicle approach notification system has acoustic characteristics that a signal or sound having at least two one-third octave bands is formed in a signal or sound transmission path from the notification-sound sound source to a hearing position of the notification sound.

The vehicle approach notification method according to one aspect of the present disclosure includes obtaining vehicle information from a vehicle; setting, according to the vehicle information, at least one of a notification-sound sound source to be used in generation of a notification sound, a filter property to be applied to a filter, or a control parameter to be applied in generation of a signal corresponding to the notification sound, the notification sound notifying of approaching of the vehicle; generating the signal corresponding to the notification sound, based on the sound signal obtained from the notification-sound sound source; and outputting the signal generated, through the filter to an exterior loudspeaker provided to the vehicle.

These general or specific aspects may be implemented as a system, a method, an integrated circuit, a computer program, or a recording medium such as a computer-readable CD-ROM, or may be implemented as any combination of a system, a method, an integrated circuit, a computer program, and a recording medium. The recording medium may be a non-transitory recording medium.

The vehicle approach notification device according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 9 is a flowchart illustrating the vehicle approach notification method according to another embodiment.

Figure 1:
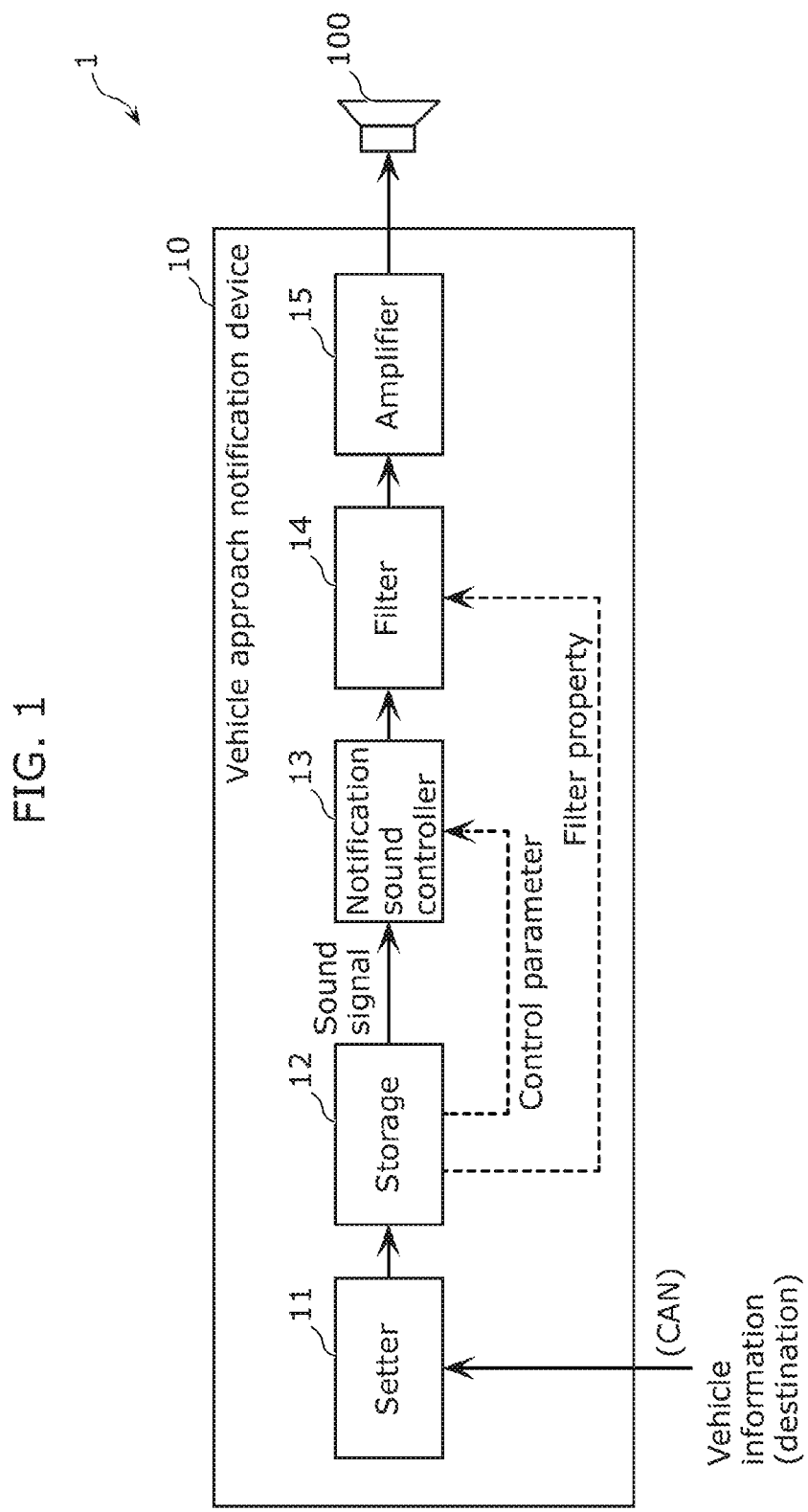
FIG. 1 is a block diagram illustrating the configuration of a vehicle approach notification system according to Embodiment 1.

DESCRIPTION OF EMBODIMENTS (Underlying Knowledge Forming Basis of the Present Disclosure)

The properties of notification sounds output from silent vehicles such as electric vehicles and hybrid vehicles are restricted by regulations, and the notification sounds should be generated to satisfy such restrictions. For example, in UN/ECE R138, the notification sound should satisfy a restriction that the sound pressure levels of at least two one-third octave bands contained in the notification sound are higher than or equal to a predetermined overall (OA) level. For example, in FMVSS 141, the notification sound should satisfy a restriction that the sound pressure levels of four non-adjacent one-third octave bands contained in the notification sound are higher than or equal to a predetermined OA level, or a restriction that the sum of the sound pressure levels of two non-adjacent one-third octave bands contained in the notification sound is higher than or equal to the predetermined OA.

Based on such knowledge, the present inventors have conducted research on a vehicle approach notification system which can easily generate notification sounds satisfying such restrictions.

The vehicle approach notification system according to one aspect of the present disclosure includes a filter; a notification sound controller which generates a signal corresponding to a notification sound for notifying of approaching of a vehicle, based on a sound signal obtained from a notification-sound sound source; and a setter which obtains vehicle information of the vehicle, and sets, according to the vehicle information, at least one of the notification-sound sound source to be used in generation of the notification sound, a filter property to be applied to the filter, or a control parameter to be applied to the notification sound controller in generation of the notification sound. Here, the notification sound controller outputs the signal generated, through the filter to an exterior loudspeaker provided to the vehicle.

Thereby, the notification-sound sound source to be used in generation of the notification sound, the filter property of the filter which filters the signal corresponding to the notification sound, or the control parameter for the notification sound controller which generates the notification sound is automatically set according to the vehicle information from the vehicle (e.g., information indicating the destination of the vehicle), and thus, a notification sound satisfying the restriction to be applied in the destination can be easily generated.

The vehicle approach notification system according to one aspect of the present disclosure includes a notification sound controller which generates a signal corresponding to a notification sound for notifying of approaching of a vehicle, based on a sound signal obtained from a notification-sound sound source, and outputs the signal generated to an exterior loudspeaker provided to the vehicle. Here, the vehicle approach notification system has acoustic characteristics that a signal or sound having at least two one-third octave bands is formed in a signal or sound transmission path from the notification-sound sound source to a hearing position of the notification sound.

For example, in the regulations such as UN/ECE R138 or FMVSS 141, the notification sound should satisfy the restriction on at least two one-third octave bands. For this reason, in such a vehicle approach notification system having the acoustic characteristics that a signal or sound having at least two one-third octave bands is formed in the signal or sound transmission path from the notification-sound sound source to the hearing position of the notification sound, the notification sound satisfying the restriction specified by such regulations can be easily generated.

For example, the vehicle approach notification system may further include the exterior loudspeaker. Here, the exterior loudspeaker may have the acoustic characteristics.

As above, the acoustic characteristics that the sound having at least two one-third octave bands is formed may be implemented by the exterior loudspeaker.

For example, the vehicle approach notification system may further include the exterior loudspeaker; and a resonator which is provided to the vehicle and through which the notification sound output from the exterior loudspeaker passes. Here, the resonator may have the acoustic characteristics.

As above, the acoustic characteristics that the sound having at least two one-third octave bands is formed may be implemented by the resonator.

For example, the vehicle approach notification system may further include a filter. Here, the notification sound controller may output the signal generated to the exterior loudspeaker through the filter, and the signal having at least two one-third octave bands may pass through the filter.

As above, the acoustic characteristics that the signal having at least two one-third octave bands is formed may be implemented by the filter.

For example, the filter may be configured with a notch filter, a band elimination filter, or a band-pass filter.

For example, the signal having at least two one-third octave bands may be formed by attenuating part of a frequency band by a notch filter or a band elimination filter, or the signal having at least two one-third octave bands may be formed by passing part of a frequency band through the band-pass filter.

For example, the sound signal obtained from the notification-sound sound source may have a frequency band containing the at least two one-third octave bands.

As above, because the at least two one-third octave bands are contained in the frequency band of the sound signal obtained from the notification-sound sound source, the signal or sound having the at least two one-third octave bands can be formed.

For example, the vehicle approach notification system may further include a sound effect controller which generates a signal corresponding to a sound effect to be output to an interior of the vehicle, based on the sound signal obtained from the notification-sound sound source.

Thereby, the sound effect such as a welcoming sound can be output to the interior of the vehicle. Alternatively, the sound effect such as an acceleration sound of the vehicle can be output to the interior of the vehicle. For example, because electric vehicles and hybrid vehicles are silent, the acceleration sound during driving is small, which makes it difficult for a passenger to feel a sense of unity with the vehicle. Generation of the signal corresponding to the sound effect (acceleration sound of the vehicle) can produce the sound effect to increase a stage effect in the interior of the vehicle.

For example, the vehicle approach notification system may further include a sound effect controller which generates a signal corresponding to a sound effect to be output to an interior of the vehicle, based on a sound signal obtained from a sound effect sound source which is different from the notification-sound sound source.

As above, the signal corresponding to the sound effect can be generated from the sound effect sound source.

For example, the notification sound controller may generate a signal corresponding to the notification sound, based on the sound signal obtained from the notification-sound sound source and the sound signal obtained from the sound effect sound source. Specifically, the notification sound controller may generate the signal corresponding to the notification sound, based on an addition signal obtained by adding the sound signal obtained from the notification-sound sound source and the sound signal obtained from the sound effect sound source.

For example, when the notification sound is output to the outside of the vehicle, the notification sound may also invade the interior of the vehicle and be mixed with the sound effect which is being output to the interior of the vehicle, causing unpleasantness to a passenger in the interior of the vehicle in some cases. Thus, by forming the signal corresponding to the notification sound from the sound signal obtained from the notification-sound sound source and the sound signal obtained from the sound effect sound source, specifically, by generating the signal corresponding to the notification sound from the addition signal obtained by adding these sound signals, the resulting notification sound contains components of the sound effect. In other words, the same components contained in the sound effect to be output to the interior of the vehicle are also contained in the notification sound, thus reducing unpleasantness given to the passenger even if the notification sound invading the interior of the vehicle is mixed with the sound.

For example, at least one of the notification-sound sound source or the sound effect sound source may be rewritten.

Thereby, the notification-sound sound source or the sound effect sound source can be rewritten to enable output of the notification sound or the sound effect according to the liking. A vehicle approach notification system having such a configuration is readily adaptable when the regulations are changed.

For example, the sound effect sound source may be stored in an external memory.

Thereby, the sound effect from the sound effect sound source stored in the external memory can be output. A vehicle approach notification system having such a configuration is readily adaptable when the regulations are changed.

For example, the sound effect controller may output the signal generated to an interior loudspeaker provided to the vehicle.

Thereby, the sound effect can be output from the interior loudspeaker.

For example, the vehicle approach notification system may further include an in-vehicle acoustic system including: an amplifier which drives an audio loudspeaker provided to the vehicle; and an external input receiver which receives an input of an external signal. Here, the sound effect controller may output the signal generated to the audio loudspeaker through the external input receiver in the in-vehicle acoustic system.

Thereby, the sound effect can be output from an existing audio loudspeaker which outputs the music and the like, without providing a dedicated interior loudspeaker for outputting the sound effect.

The vehicle approach notification method according to one aspect of the present disclosure includes obtaining vehicle information from a vehicle; setting, according to the vehicle information, at least one of a notification-sound sound source to be used in generation of a notification sound, a filter property to be applied to a filter, or a control parameter to be applied in generation of a signal corresponding to the notification sound, the notification sound notifying of approaching of the vehicle; generating the signal corresponding to the notification sound, based on the sound signal obtained from the notification-sound sound source; and outputting the signal generated, through the filter to an exterior loudspeaker provided to the vehicle.

Thereby, the notification-sound sound source to be used in generation of the notification sound, the filter property of the filter which filters the signal corresponding to the notification sound, or the control parameter to be applied in generation of the notification sound is automatically set according to the vehicle information from the vehicle (e.g., the information indicating the destination of the vehicle). Thus, the notification sounds satisfying the restrictions specified by the regulations can be easily generated.

Hereinafter, embodiments will be specifically described with reference to the drawings.

The embodiments described below all illustrate general or specific examples. Numeric values, shapes, materials, components, arrangement positions of components and connections forms thereof, steps, order of steps, and the like shown in embodiments below are exemplary, and should not be construed as limitations to the present disclosure.

Embodiment 1

The vehicle approach notification system according to Embodiment 1 will be described with reference to FIG. 1.

FIG. 1 is a block diagram illustrating the configuration of vehicle approach notification system 1 according to Embodiment 1.

Vehicle approach notification system 1 is a system for outputting a notification sound which notifies an outside of a vehicle about approaching of the vehicle, which is a silent vehicle such as an electric vehicle or a hybrid vehicle. As illustrated in FIG. 1, vehicle approach notification system 1 includes vehicle approach notification device 10 and loudspeaker 100.

Loudspeaker 100 is an exterior loudspeaker provided to the vehicle.

Vehicle approach notification device 10 is a device for performing notification about approaching of the vehicle using loudspeaker 100 provided to the vehicle. Vehicle approach notification device 10 performs notification of approaching of the vehicle by outputting a notification sound (e.g., a warning sound) from loudspeaker 100 toward a pedestrian and the like present outside the vehicle. For example, vehicle approach notification device 10 is an electronic control unit (ECU) provided to the vehicle. Vehicle approach notification device 10 includes setter 11, storage 12, notification sound controller 13, filter 14, and amplifier 15.

Vehicle approach notification device 10 is a computer including a processor (central processing unit, CPU) and a memory. The memory is a read only memory (ROM) and a random access memory (RAM), and can store programs executed by the processor. Setter 11 and notification sound controller 13 are implemented by the processor which executes the programs stored in the memory, and the like. Storage 12 is implemented with the memory and the like. Storage 12 may be a different memory from the memory which stores the programs.

Setter 11 obtains vehicle information of the vehicle, and sets, according to the vehicle information, at least one of a notification-sound sound source to be used in generation of the notification sound, a filter property to be applied to filter 14, or a control parameter to be applied to notification sound controller 13 in generation of the notification sound. For example, the vehicle information is information obtained through a controller area network (CAN), and contains information indicating the destination of the vehicle. Storage 12 stores a plurality of notification-sound sound sources, a plurality of filter properties, or a plurality of control parameters. Among the plurality of notification-sound sound sources, the plurality of filter properties, or the plurality of control parameters stored in storage 12, setter 11 selects a notification-sound sound source, a filter property, or a control parameter according to the vehicle information (information indicating the destination of the vehicle). Using the selected notification-sound sound source, filter property, or control parameter, the notification sound is generated.

For example, storage 12 stores the notification-sound sound sources, the filter properties, or the control parameters corresponding to the regulations different among the destinations. For example, when three different regulations are present, three notification-sound sound sources, three filter properties, or three control parameters are stored. The plurality of notification-sound sound sources are sound sources for notification sounds which satisfy the different restrictions, respectively. The plurality of control parameters are parameters to be applied to notification sound controller 13 when notification sound controller 13 generates a signal corresponding to the notification sound based on the sound signal obtained from the notification-sound sound source, and are parameters for generating signals corresponding to the notification sounds which satisfy the restrictions specified by different regulations. The plurality of filter properties are properties to be applied to filter 14 which filters the signal generated by notification sound controller 13, and are properties for filtering to obtain signals corresponding to the notification sounds which satisfy the restrictions specified by the different regulations.

Setter 11 may set any one of the notification-sound sound source, the filter property, and the control parameter according to the vehicle information. In this case, storage 12 may store any one of the plurality of notification-sound sound sources, the plurality of filter properties, and the plurality of control parameters, and may not store the remaining two of them. Alternatively, setter 11 may set two of the notification-sound sound source, the filter property, and the control parameter according to the vehicle information. In this case, storage 12 may store two of the plurality of notification-sound sound sources, the plurality of filter properties, and the plurality of control parameters, and may not store the remaining one of them. Alternatively, setter 11 may set all of the notification-sound sound source, the filter property, and the control parameter according to the vehicle information. In this case, storage 12 stores all of the plurality of notification-sound sound sources, the plurality of filter properties, and the plurality of control parameters.

Notification sound controller 13 generates the signal corresponding to the notification sound for notifying of approaching of the vehicle, based on the sound signal obtained from the notification-sound sound source. For example, notification sound controller 13 processes the sound signal based on the applied control parameter such that the frequency properties of the notification sound are controlled to desired properties. In other words, notification sound controller 13 processes the sound signal based on the control parameter corresponding to the information indicating the destination, such that the frequency properties of the notification sound are controlled to the properties satisfying the restriction specified by the regulations in the destination. For example, the control parameters include parameters on the raising rate of the pitch or the sound volume relative to the speed of the vehicle, and notification sound controller 13 can adjust the pitch or volume of the notification sound according to the speed of the vehicle. Notification sound controller 13 then outputs the generated signal through filter 14 (specifically, through filter 14 and amplifier 15) to loudspeaker 100.

Filter 14 is disposed between notification sound controller 13 and loudspeaker 100 (specifically, amplifier 15), and passes or attenuates a predetermined frequency band. For example, filter 14 is a filter which can vary passing properties or attenuation properties corresponding to the applied filter property, and is a digital filter, for example. For example, based on the applied filter property, filter 14 filters the signal generated in notification sound controller 13 such that the frequency properties of the notification sound are controlled to desired properties. In other words, filter 14 filters the signal generated in notification sound controller 13, based on the filter property corresponding to the information indicating the destination, such that the frequency properties of the notification sound are controlled to properties which satisfy the restriction specified in the regulations in the destination.

Amplifier 15 is connected between filter 14 and loudspeaker 100. Amplifier 15 amplifies the signal by a predetermined amplification degree, the signal being output from the notification-sound sound source, processed in notification sound controller 13, and filtered by filter 14, and outputs the amplified signal to loudspeaker 100. Thereby, the notification sound is output from loudspeaker 100.

When the notification-sound sound source corresponding to the information indicating the destination is set, in some cases, the sound signal obtained from the notification-sound sound source can be the signal corresponding to the notification sound which satisfies the restriction specified by the regulations in the destination. For this reason, in this case, setter 11 may not set the control parameter and the filter property. In other words, in this case, the control parameter and the filter property may have fixed values.

When the control parameter corresponding to the information indicating the destination is set, in some cases, the signal generated by notification sound controller 13 can be the signal corresponding to the notification sound which satisfies the restriction specified by the regulations in the destination. For this reason, in this case, setter 11 may not set the notification-sound sound source and the filter property. In other words, in this case, the notification-sound sound source may be a fixed sound source, and the filter property may be a fixed value.

When the filter property corresponding to the information indicating the destination is set, in some cases, the signal filtered by filter 14 and output from filter 14 can be the signal corresponding to the notification sound which satisfies the restriction specified by the regulations in the destination. For this reason, in this case, setter 11 may not set the notification-sound sound source and the control parameter.

Because as described above, the notification-sound sound source to be used in generation of the notification sound, the filter property of filter 14 which filters the signal corresponding to the notification sound, or the control parameter for notification sound controller 13 which generates the notification sound is automatically set corresponding to the vehicle information from the vehicle (e.g., information indicating the destination of the vehicle), the notification sound which satisfies the restriction specified by the regulations in the destination can be easily generated.

Setter 11, storage 12, notification sound controller 13, filter 14, and amplifier 15 may be distributed to and arranged in a plurality of housings. Such a configuration will be described with reference to FIG. 2.

Figure 2:
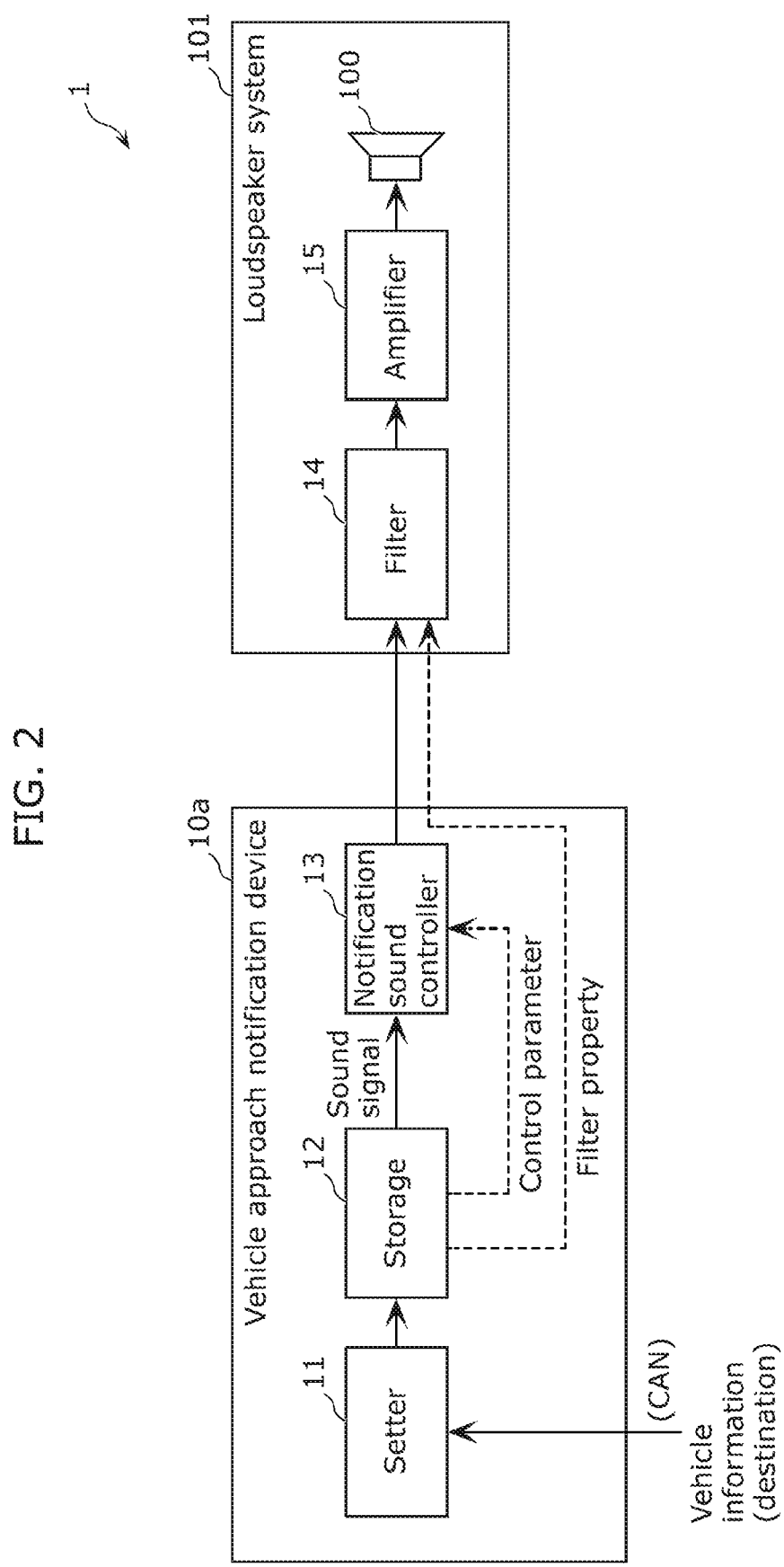
FIG. 2 is a block diagram illustrating another example of the configuration of the vehicle approach notification system according to Embodiment 1.

FIG. 2 is a block diagram illustrating another example of the configuration of vehicle approach notification system 1 according to Embodiment 1.

Vehicle approach notification system 1 may include vehicle approach notification device 10a and loudspeaker system 101, instead of vehicle approach notification device 10 and loudspeaker 100. Unlike vehicle approach notification device 10, vehicle approach notification device 10a does not include filter 14 and amplifier 15.

Loudspeaker system 101 is a system including filter 14, amplifier 15, and loudspeaker 100. Like loudspeaker system 101, filter 14 and amplifier 15 may be integrally formed with loudspeaker 100.

For example, vehicle approach notification device 10a and loudspeaker system 101 can be connected with a cable which transmits digital audio signals or the like, and the signal generated in notification sound controller 13 and the filter property set by setter 11 may be transmitted through such a cable to loudspeaker system 101.

As above, setter 11, storage 12, notification sound controller 13, filter 14, and amplifier 15 may not be arranged in a single housing (device), and may be distributed to and arranged in a plurality of housings.

Modification of Embodiment 1

Although an example has been described in Embodiment 1 in which vehicle approach notification system 1 has a function to output the notification sound, vehicle approach notification system 1 may further have a function to output a sound effect to the interior of the vehicle. Such a configuration will be described as a modification of Embodiment 1 with reference to FIG. 3.

Figure 3:
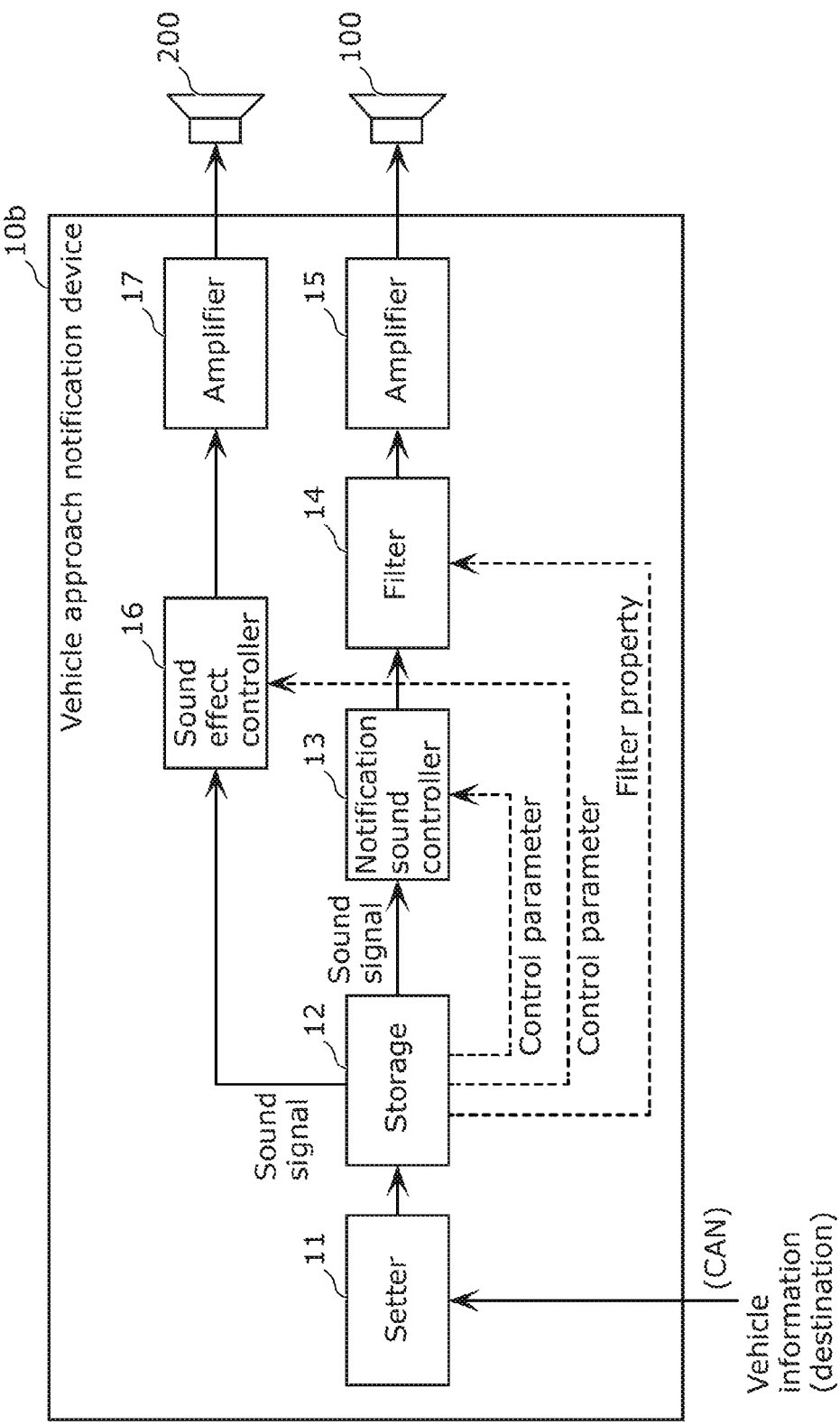
FIG. 3 is a block diagram illustrating the configuration of a vehicle approach notification system according to a modification of Embodiment 1.

FIG. 3 is a block diagram illustrating the configuration of vehicle approach notification system 1a according to a modification of Embodiment 1.

Unlike vehicle approach notification system 1 according to Embodiment 1, vehicle approach notification system 1a includes vehicle approach notification device 10b instead of vehicle approach notification device 10, and further includes loudspeaker 200. Unlike vehicle approach notification device 10 according to Embodiment 1, vehicle approach notification device 10b further includes sound effect controller 16 and amplifier 17. The functions of setter 11, notification sound controller 13, filter 14, amplifier 15, and loudspeaker 100 are the same as those in Embodiment 1, and therefore the descriptions thereof will be omitted.

Loudspeaker 200 is an interior loudspeaker provided to the vehicle.

Storage 12 further stores the control parameter for sound effect controller 16.

Sound effect controller 16 generates a signal corresponding to the sound effect to be output to the interior of the vehicle, based on the sound signal obtained from the notification-sound sound source. In other words, sound effect controller 16 generates the signal corresponding to the sound effect using the sound signal obtained from the notification-sound sound source. For example, the sound effect may be a welcoming sound, or may be an acceleration sound of the vehicle. For example, sound effect controller 16 may process the sound signal obtained from the notification-sound sound source such that the pitch of the sound effect (acceleration sound) changes corresponding to the control parameter. For example, the control parameter for sound effect controller 16 may change the pitch of the sound effect corresponding to the speed of the vehicle or the number of rotations of the engine. Sound effect controller 16 outputs the generated signal through amplifier 17 to loudspeaker 200.

Amplifier 17 is connected between sound effect controller 16 and loudspeaker 200. Amplifier 17 amplifies the signal processed in sound effect controller 16 by a predetermined amplification degree, and outputs the amplified signal to loudspeaker 200. Thereby, the sound effect is output from loudspeaker 200. Vehicle approach notification device 10b may not include amplifier 17, and amplifier 15 may amplify the signal filtered by filter 14 by a predetermined amplification degree and output the amplified signal to loudspeaker 100, and may amplify the signal processed in sound effect controller 16 by a predetermined amplification degree and output the amplified signal to loudspeaker 200. Alternatively, vehicle approach notification device 10b may not include amplifier 15, and amplifier 17 may amplify the signal filtered by filter 14 by a predetermined amplification degree and output the amplified signal to loudspeaker 100, and may amplify the signal processed in sound effect controller 16 by a predetermined amplification degree and output the amplified signal to loudspeaker 200.

Because the vehicles such as electric vehicles and hybrid vehicles are silent, the acceleration sound during driving is small, which makes it difficult for a passenger to feel a sense of unity with the vehicle. Generation of the signal corresponding to the sound effect (acceleration sound of the vehicle) can produce the sound effect to increase a stage effect in the interior of the vehicle.

Storage 12 may further store a sound effect sound source different from the notification-sound sound source. In this case, sound effect controller 16 may generate the signal corresponding to the sound effect to be output to the interior of the vehicle, based on the sound signal obtained from the sound effect sound source. In other words, sound effect controller 16 may use the sound signal obtained from the sound effect sound source, rather than using the sound signal obtained from the notification-sound sound source.

Notification sound controller 13 may generate the signal corresponding to the notification sound, based on the sound signal obtained from the notification-sound sound source and the sound signal obtained from the sound effect sound source. Specifically, notification sound controller 13 may generate the signal corresponding to the notification sound, based on the addition signal obtained by adding the sound signal obtained from the notification-sound sound source and the sound signal obtained from the sound effect sound source.

For example, when the notification sound is output to the outside of the vehicle, the notification sound may also invade the interior of the vehicle and be mixed with the sound effect which is being output to the interior of the vehicle, causing unpleasantness to a passenger in the interior of the vehicle in some cases. Thus, by forming the signal corresponding to the notification sound from the sound signal obtained from the notification-sound sound source and the sound signal obtained from the sound effect sound source, specifically, by generating the signal corresponding to the notification sound from the addition signal obtained by adding these sound signals, the resulting notification sound contains components of the sound effect. In other words, the same components contained in the sound effect to be output to the interior of the vehicle are also contained in the notification sound, thus reducing unpleasantness given to the passenger even if the notification sound invading the interior of the vehicle is mixed with the sound effect which is being output to the interior of the vehicle.

Moreover, at least one of the notification-sound sound source or the sound effect sound source stored in storage 12 may be rewritten. For example, the notification-sound sound source may be rewritten, the sound effect sound source may be rewritten, or both of the notification-sound sound source and the sound effect sound source may be rewritten. For example, the notification-sound sound source or the sound effect sound source may be rewritten by a rewriter (rewriting function) included in vehicle approach notification system 1a, or may be rewritten by a rewriter included in an external device for vehicle approach notification system 1a. Specifically, by operating the rewriter by a passenger or a mechanic of the vehicle, the rewriter may rewrite the notification-sound sound source or the sound effect sound source stored in storage 12 to a sound source stored in an external memory. Alternatively, the rewriter may automatically perform rewriting. Alternatively, the rewriter may download a sound source from a network, and may rewrite the notification-sound sound source or the sound effect sound source stored in storage 12 to the downloaded sound source. Alternatively, an external device including the rewriter may be connected to vehicle approach notification system 1a to perform rewriting. Thereby, the notification-sound sound source or the sound effect sound source can be rewritten to enable output of the notification sound according to the liking of the passenger to the outside of the vehicle and output of the sound effect according to the liking of the passenger to the interior of the vehicle. Moreover, a vehicle approach notification system having such a configuration is readily adaptable when the regulations are changed.

The sound effect sound source may also be stored in an external memory such as an SD memory card or a universal serial bus (USB) memory. Thereby, the sound effect according to the liking of the passenger can be output to the interior of the vehicle from the sound effect sound source stored in the external memory. A vehicle approach notification system having such a configuration is readily adaptable when the regulations are changed.

Embodiment 2

The vehicle approach notification system according to Embodiment 2 will be described with reference to FIG. 4.

Figure 4:
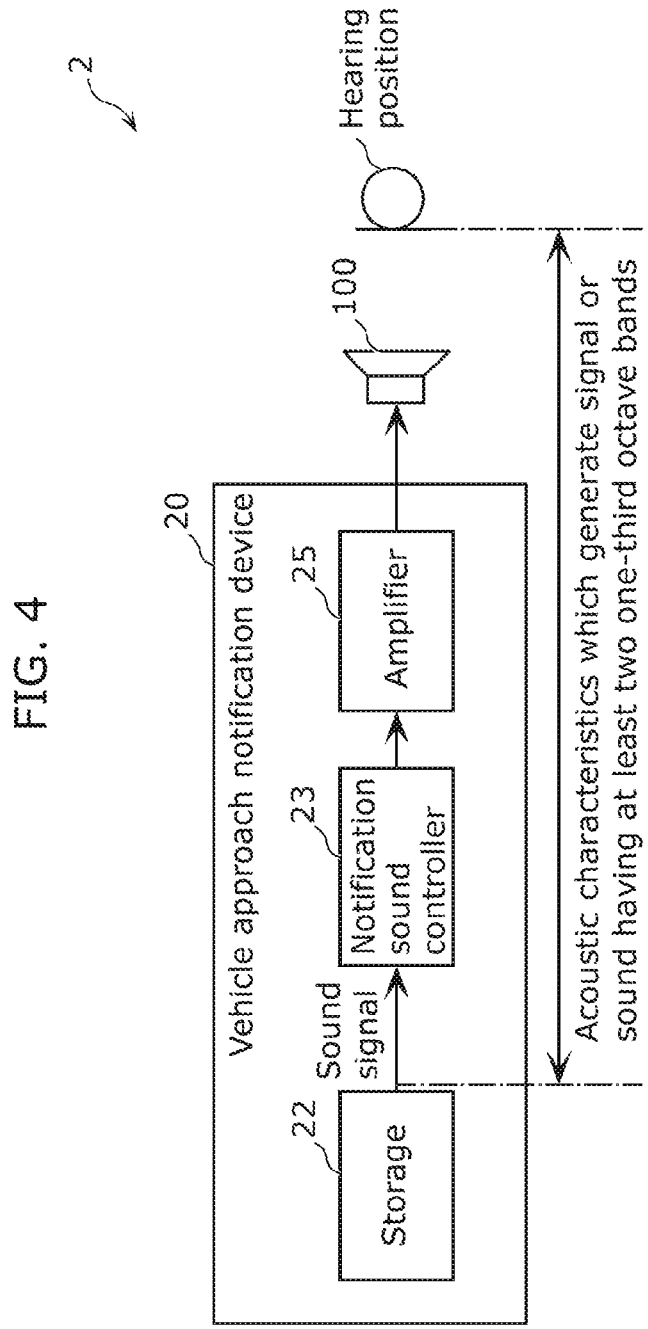
FIG. 4 is a block diagram illustrating the configuration of a vehicle approach notification system according to Embodiment 2.

FIG. 4 is a block diagram illustrating the configuration of vehicle approach notification system 2 according to Embodiment 2.

Vehicle approach notification system 2 is a system for outputting a notification sound which notifies an outside about approaching of a vehicle as a silent vehicle such as an electric vehicle or a hybrid vehicle. As illustrated in FIG. 4, vehicle approach notification system 2 includes vehicle approach notification device 20 and loudspeaker 100.

Loudspeaker 100 is an exterior loudspeaker provided to the vehicle.

Vehicle approach notification device 20 is a device for performing notification about approaching of the vehicle using loudspeaker 100 provided to the vehicle. Vehicle approach notification device 20 performs notification about approaching of the vehicle by outputting a notification sound (e.g., a warning sound) from loudspeaker 100 toward a pedestrian present outside the vehicle. For example, vehicle approach notification device 20 is an electronic control unit (ECU) provided to the vehicle. Vehicle approach notification device 20 includes storage 22, notification sound controller 23, and amplifier 25.

Vehicle approach notification device 20 is a computer including a processor (central processing unit, CPU) and a memory. The memory is a read only memory (ROM) and a random access memory (RAM), and can store programs executed by the processor. Notification sound controller 23 is implemented by the processor which executes the programs stored in the memory, and the like. Storage 22 is implemented with the memory and the like. Storage 22 may be a different memory from the memory which stores the programs.

Storage 22 stores a notification-sound sound source.

Notification sound controller 23 generates the signal corresponding to the notification sound for notifying of approaching of the vehicle, based on the sound signal obtained from the notification-sound sound source, and outputs the generated signal to loudspeaker 100. Specifically, notification sound controller 23 outputs the generated signal through amplifier 25 to loudspeaker 100.

Amplifier 25 is connected between notification sound controller 23 and loudspeaker 100. Amplifier 25 amplifies the signal by a predetermined amplification degree, the signal being output from the notification-sound sound source and processed in notification sound controller 23, and outputs the amplified signal to loudspeaker 100. Thereby, the notification sound is output from loudspeaker 100.

Vehicle approach notification system 2 has acoustic characteristics that a signal or sound having at least two one-third octave bands is formed in a signal or sound transmission path from the notification-sound sound source (e.g., storage 22) to the hearing position of the notification sound.

For example, in the regulations such as UN/ECE R138 or FMVSS 141, the notification sound should satisfy the restriction on the at least two one-third octave bands. Specifically, in UN/ECE R138, the notification sound should satisfy a restriction that the sound pressure levels of the at least two one-third octave bands contained in the notification sound are higher than or equal to a predetermined OA level. For example, in FMVSS 141, the notification sound should satisfy a restriction that the sound pressure levels of four non-adjacent one-third octave bands contained in the notification sound are higher than or equal to a predetermined OA level, or a restriction that the sum of the sound pressure levels of two non-adjacent one-third octave bands contained in the notification sound is higher than or equal to the predetermined OA level. Thus, vehicle approach notification system 2 has acoustic characteristics that a signal or sound having at least two one-third octave bands is formed in the signal or sound transmission path from the notification-sound sound source to the hearing position of the notification sound.

For example, vehicle approach notification system 2 has acoustic characteristics that the sound pressure levels of at least two one-third octave bands contained in the notification sound are higher than or equal to a predetermined OA level in the signal or sound transmission path from the notification-sound sound source to the hearing position of the notification sound. For example, vehicle approach notification system 2 has acoustic characteristics that the sound pressure levels of four non-adjacent one-third octave bands contained in the notification sound are higher than or equal to a predetermined OA level in the signal or sound transmission path from the notification-sound sound source to the hearing position of the notification sound. For example, vehicle approach notification system 2 has acoustic characteristics that the sum of the sound pressure levels of two non-adjacent one-third octave bands contained in the notification sound is higher than or equal to a predetermined OA level in the signal or sound transmission path from the notification-sound sound source to the hearing position of the notification sound Thereby, a notification sound satisfying the restriction specified by UN/ECE R138 or FMVSS 141 can be easily generated. The acoustic characteristics are implemented by a variety of methods. For example, loudspeaker 100 may have the acoustic characteristics. For example, vehicle approach notification system 2 may include a resonator (not illustrated) which is provided to the vehicle and through which the notification sound output from loudspeaker 100 passes. The resonator may have the acoustic characteristics. For example, the acoustic characteristics may be implemented by a filter. Alternatively, the acoustic characteristics may be implemented by a combination thereof. Hereinafter, an example in which the acoustic characteristics are implemented by a filter will be described with reference to FIG. 5.

Figure 5:
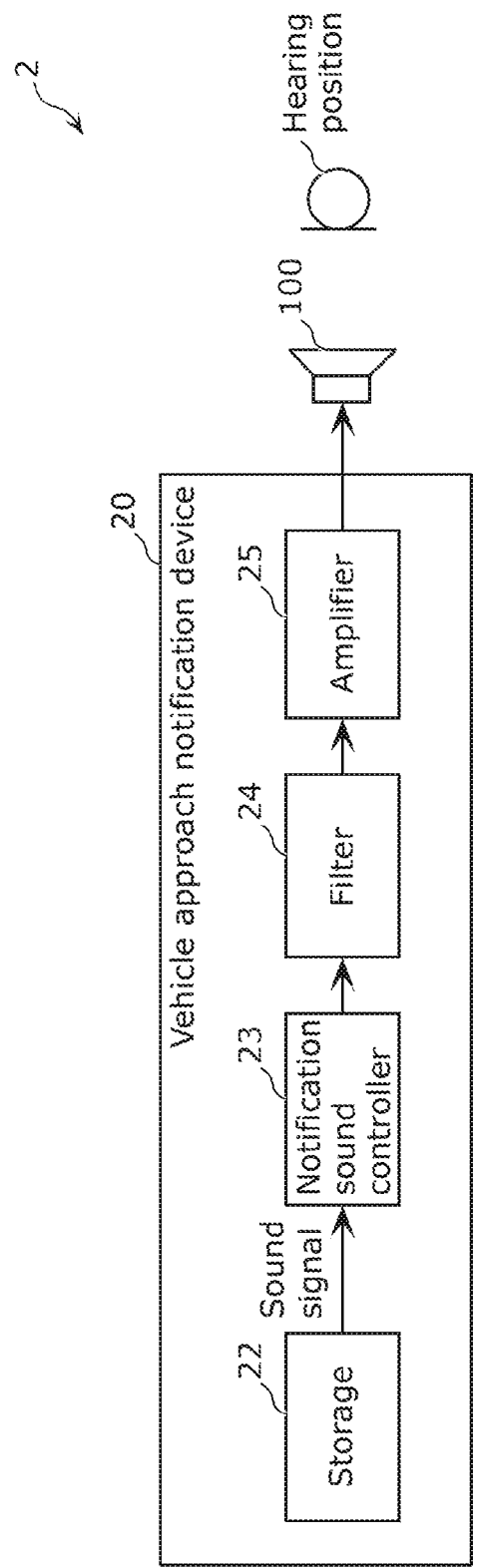
FIG. 5 is a block diagram illustrating a specific example of the configuration of the vehicle approach notification system according to Embodiment 2.

FIG. 5 is a block diagram illustrating a specific example of the configuration of vehicle approach notification system 2 according to Embodiment 2.

Vehicle approach notification device 20 includes filter 24. Filter 24 is disposed between notification sound controller 23 and loudspeaker 100 (specifically, amplifier 25) on the signal or sound transmission path from the notification-sound sound source to the hearing position of the notification sound. Notification sound controller 23 outputs the generated signal through filter 24 (specifically, through filter 24 and amplifier 25) to loudspeaker 100.

Filter 24 is a filter through which the signal having at least two one-third octave bands passes. Accordingly, the acoustic characteristics that a signal or sound having at least two one-third octave bands is formed in the signal or sound transmission path from the notification-sound sound source to the hearing position of the notification sound are implemented by filtering the signal output from notification sound controller 23 by filter 24.

Filter 24 may be configured with a notch filter, a band elimination filter, or a band-pass filter. For example, by passing the signal having at least two one-third octave bands through the band-pass filter, a signal having at least two one-third octave bands can be formed. For example, by passing at least two one-third octave bands through a notch filter or a band elimination filter and attenuating the frequency band between the at least two one-third octave bands, a signal having at least two one-third octave bands can be formed. The frequency properties of the notification sound, the frequency properties of the sound signal obtained from the notification-sound sound source, and the filter properties when a notch filter is used will be described with reference to FIG. 6.

Figure 6:
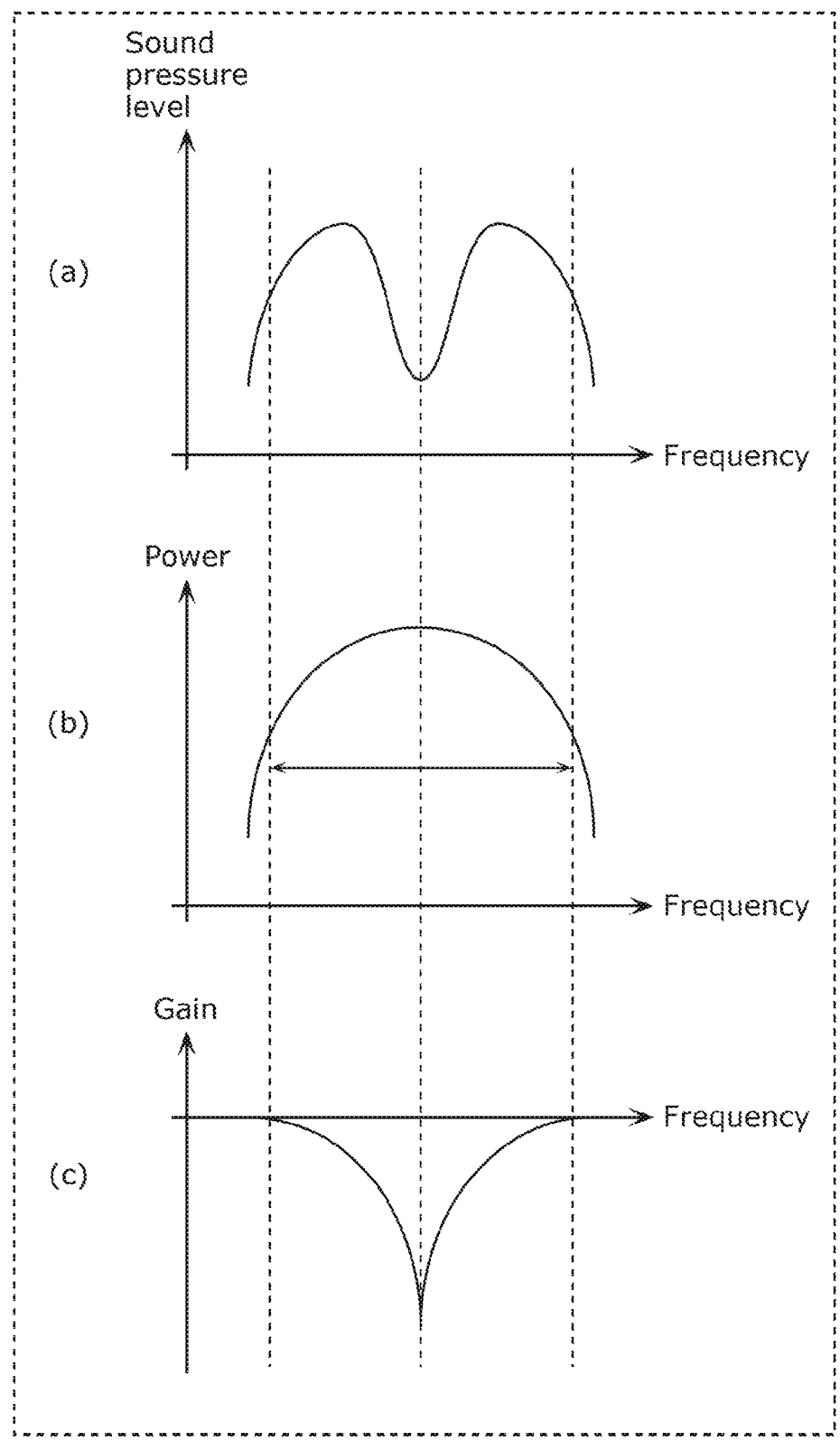
FIG. 6 is a graph illustrating frequency properties of a notification sound, frequency properties of a sound signal obtained from a notification-sound sound source, and filter properties.

FIG. 6 is a graph illustrating the frequency properties of the notification sound, the frequency properties of the sound signal obtained from the notification-sound sound source, and the filter properties. The frequency properties of the notification sound are shown in (a) of FIG. 6, the frequency properties of the sound signal obtained from the notification-sound sound source are shown in (b) of FIG. 6, and the filter properties of filter 24 are shown in (c) of FIG. 6.

For example, assume that a sound signal having the frequency properties shown in (b) of FIG. 6 is obtained from the notification-sound sound source. To form a signal having at least two one-third octave bands from such a sound signal, filter 24 has the filter properties shown in (c) of FIG. 6. By filtering the sound signal shown in (b) of FIG. 6 by filter 24 shown in (c) of FIG. 6, a notification sound having components in two one-third octave bands shown in (a) of FIG. 6 is generated, for example.

As shown in (a) and (b) of FIG. 6, the sound signal obtained from the notification-sound sound source has a frequency band containing at least two one-third octave bands (the range represented by the two-headed arrow shown in (b) of FIG. 6). Thus, a signal or sound having at least two one-third octave bands can be formed.

The one-third octave band has a wider bandwidth as the center frequency is higher. For this reason, by setting a smaller Q value of filter 24 for a higher center frequency of the one-third octave band to be formed, the one-third octave band can have a wider bandwidth at a higher center frequency.

Thus, the acoustic characteristics that a sound having at least two one-third octave bands is formed may be implemented by exterior loudspeaker 100, or may be implemented by a resonator, or may be implemented by filter 24.

Modification 1 of Embodiment 2

Although an example in which vehicle approach notification system 2 has the function to output the notification sound has been described in Embodiment 2, vehicle approach notification system 2 may further have a function to output the sound effect to the interior of the vehicle. This configuration will be described as Modification 1 of Embodiment 2 with reference to FIG. 7.

Figure 7:
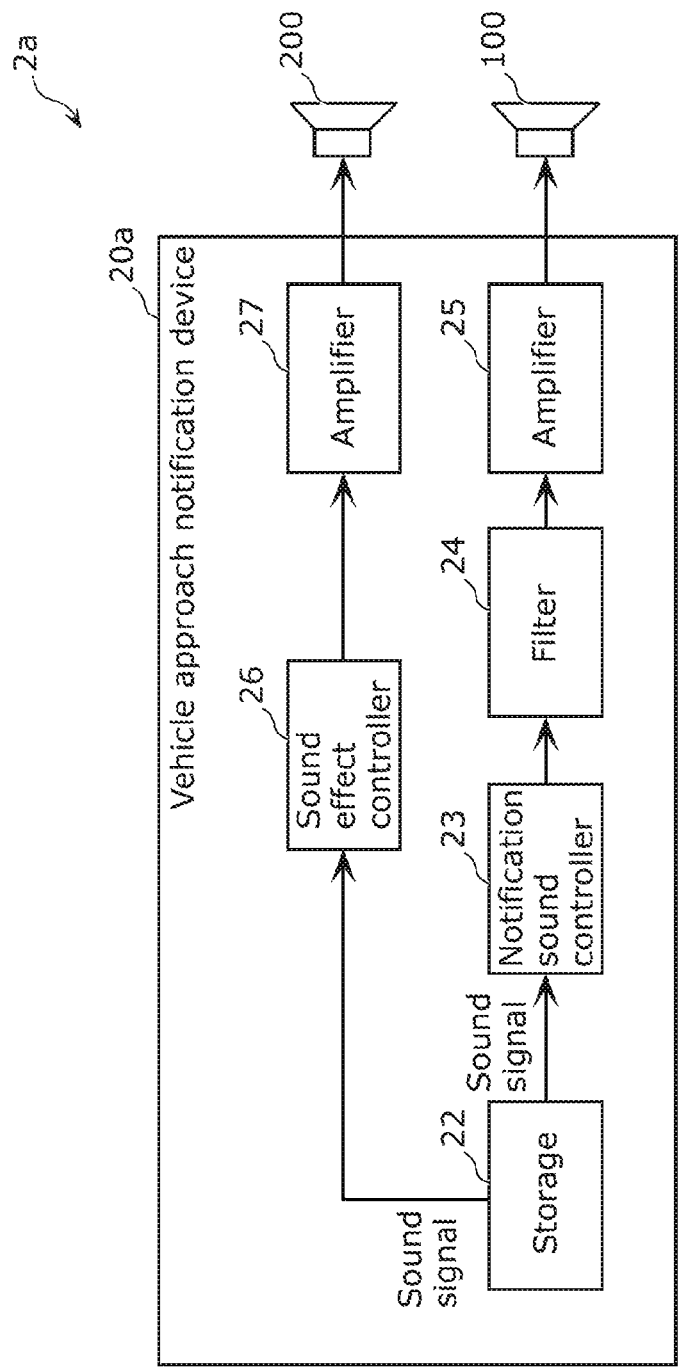
FIG. 7 is a block diagram illustrating the configuration of a vehicle approach notification system according to Modification 1 of Embodiment 2.

FIG. 7 is a block diagram illustrating the configuration of vehicle approach notification system 2a according to Modification 1 of Embodiment 2.

Unlike vehicle approach notification system 2 according to Embodiment 2, vehicle approach notification system 2a includes vehicle approach notification device 20a instead of vehicle approach notification device 20, and further includes loudspeaker 200. Unlike vehicle approach notification device 20 according to Embodiment 2, vehicle approach notification device 20a further includes sound effect controller 26 and amplifier 27. The functions of notification sound controller 23, filter 24, amplifier 25, and loudspeaker 100 are the same as those in Embodiment 2, and therefore the descriptions thereof will be omitted.

Loudspeaker 200 is an interior loudspeaker provided to the vehicle.

Sound effect controller 26 generates a signal corresponding to the sound effect to be output to the interior of the vehicle, based on the sound signal obtained from the notification-sound sound source. In other words, sound effect controller 26 generates the signal corresponding to the sound effect using the sound signal obtained from the notification-sound sound source. For example, sound effect controller 26 outputs the generated signal through amplifier 27 to loudspeaker 200.

Amplifier 27 is connected between sound effect controller 26 and loudspeaker 200. Amplifier 27 amplifies the signal by a predetermined amplification degree, the signal being processed in sound effect controller 26, and outputs the amplified signal to loudspeaker 200. Thereby, the sound effect is output from loudspeaker 200. Vehicle approach notification device 20a may not include amplifier 27, and amplifier 25 may amplify the signal filtered by filter 24, by a predetermined amplification degree and output the amplified signal to loudspeaker 100, and may amplify the signal processed in sound effect controller 26, by a predetermined amplification degree and output the amplified signal to loudspeaker 200. Alternatively, vehicle approach notification device 20a may not include amplifier 25, and amplifier 27 may amplify the signal filtered by filter 24, by a predetermined amplification degree and output the amplified signal to loudspeaker 100, and may amplify the signal processed in sound effect controller 26, by a predetermined amplification degree and output the amplified signal to loudspeaker 200.

Storage 22 may further store a sound effect sound source different from the notification-sound sound source. In this case, sound effect controller 26 may generate the signal corresponding to the sound effect to be output to the interior of the vehicle, based on the sound signal obtained from the sound effect sound source. In other words, sound effect controller 26 may use the sound signal obtained from the sound effect sound source, rather than using the sound signal obtained from the notification-sound sound source.

The function related to the sound effect in vehicle approach notification device 20a is the same as that in vehicle approach notification device 10b according to the modification of Embodiment 1, and thus the description thereof will be omitted.

Thus, generation of the signal corresponding to the sound effect can generate the sound effect in the interior of the vehicle to enhance the stage effect in the interior of the vehicle.

Modification 2 of Embodiment 2

Although an example in which vehicle approach notification system 2a includes dedicated interior loudspeaker 200 for outputting the sound effect has been described in Modification 1 of Embodiment 2, vehicle approach notification system 2a may not include loudspeaker 200. This configuration will be described as Modification 2 of Embodiment 2 with reference to FIG. 8.

Figure 8:
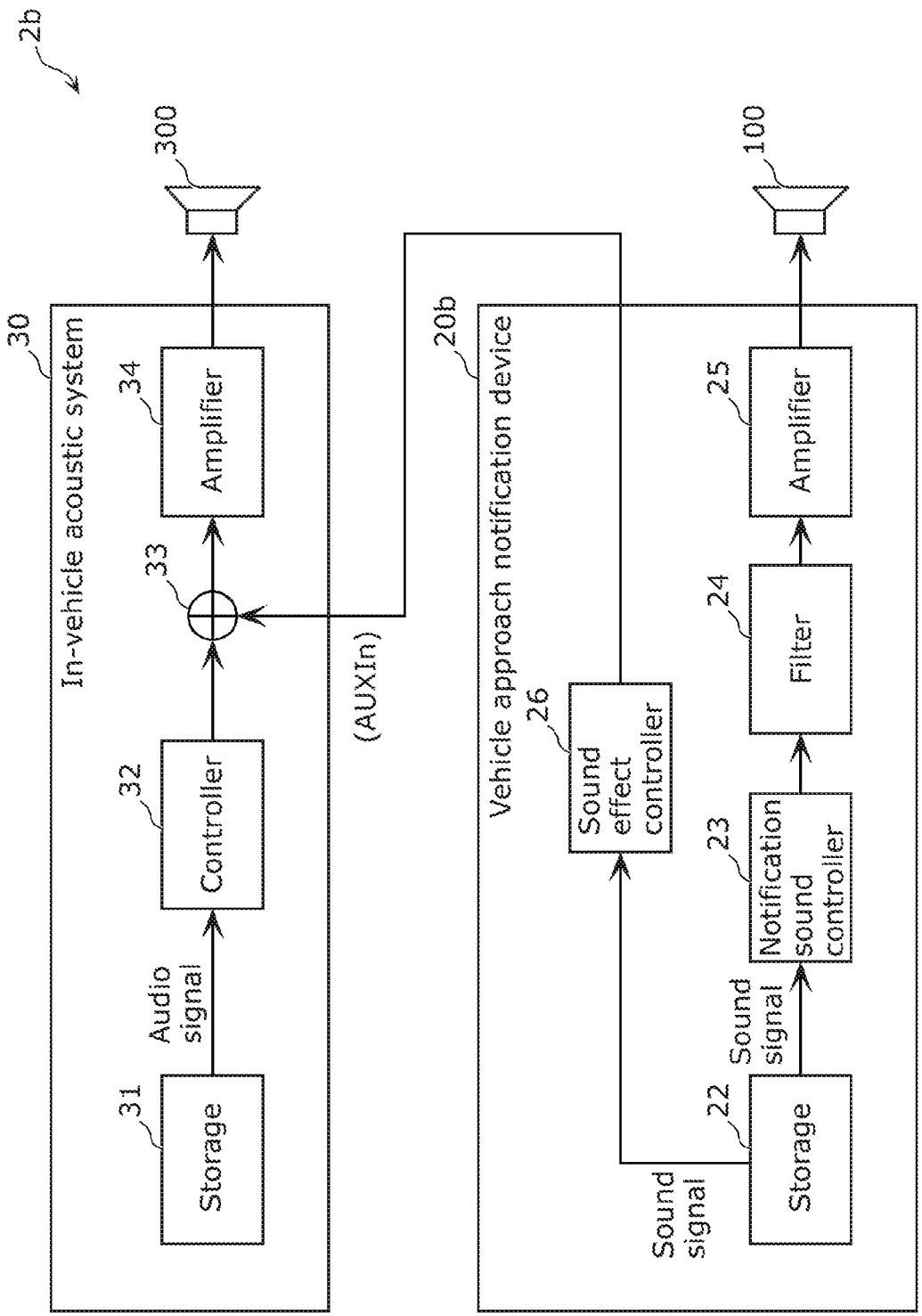
FIG. 8 is a block diagram illustrating the configuration of a vehicle approach notification system according to Modification 2 of Embodiment 2.

FIG. 8 is a block diagram illustrating the configuration of vehicle approach notification system 2b according to Modification 2 of Embodiment 2.

Unlike vehicle approach notification system 2a according to Modification 1 of Embodiment 2, vehicle approach notification system 2b includes vehicle approach notification device 20b instead of vehicle approach notification device 20a, does not include loudspeaker 200, and further includes in-vehicle acoustic system 30 and loudspeaker 300.

Unlike vehicle approach notification device 20a according to Modification 1 of Embodiment 2, vehicle approach notification device 20b does not include amplifier 27, and sound effect controller 26 outputs the generated signal to in-vehicle acoustic system 30. Other features are the same as those in Modification 1 of Embodiment 2, and therefore the descriptions thereof will be omitted.

Loudspeaker 300 is an audio loudspeaker provided to the vehicle, and usually music or the like is output from loudspeaker 300 to the interior of the vehicle.

In-vehicle acoustic system 30 includes storage 31 which stores an audio sound source; controller 32 which generates a signal corresponding to a music sound, based on an audio signal obtained from the audio sound source; adder 33 which adds the signal generated in controller 32 and the signal generated in sound effect controller 26; amplifier 34 which drives loudspeaker 300; and an external input receiver which receives an input of an external signal. The signal generated in sound effect controller 26 is input into the external input receiver. For example, the external input receiver is an AUX terminal.

Sound effect controller 26 outputs the generated signal to loudspeaker 300 through the external input receiver of in-vehicle acoustic system 30. When the music is being output to the interior of the vehicle, adder 33 may add the signal corresponding to the sound effect to the signal generated in controller 32, and the sound effect with the music may be output from loudspeaker 300. When the music is not output to the interior of the vehicle, only the sound effect may be output from loudspeaker 300.

Thereby, the sound effect is output from existing audio loudspeaker 300 which outputs the music and the like, without providing dedicated interior loudspeaker 200 for outputting the sound effect.

Also in the modification of Embodiment 1, vehicle approach notification system 1a may not include amplifier 17 and loudspeaker 200, and the signal generated in sound effect controller 16 may be output to audio loudspeaker 300 through the external input receiver of in-vehicle acoustic system 30.

Other Embodiments

As above, the vehicle approach notification systems according to the embodiments of the present disclosure have been described, but these embodiments above should not be construed as limitations to the present disclosure.

For example, the vehicle approach notification system may not include a loudspeaker. For example, the vehicle approach notification system may be a device configured with a single housing (e.g., vehicle approach notification device).

For example, the vehicle approach notification system may not include an amplifier.

The present disclosure can be implemented not only as a vehicle approach notification system but also as a vehicle approach notification method including steps (processing) executed by the components which constitute the vehicle approach notification system.

FIG. 9 is a flowchart illustrating the vehicle approach notification method according to another embodiment.

As illustrated in FIG. 9, the vehicle approach notification method includes processing of obtaining vehicle information from a vehicle (Step S11); setting, according to the vehicle information, at least one of a notification-sound sound source to be used in generation of the notification sound, a filter property to be applied to a filter, or a control parameter to be applied in generation of a signal corresponding to the notification sound, the notification sound notifying of approaching of the vehicle (Step S12); generating a signal corresponding to the notification sound, based on the sound signal obtained from the notification-sound sound source (Step S13); and outputting the generated signal through a filter to an interior loudspeaker provided to the vehicle (Step S14).

For example, the steps in the vehicle approach notification method may be executed by a computer (computer system). The present disclosure can be implemented as a program for causing the computer to execute the steps included in the vehicle approach notification method.

Furthermore, the present disclosure can be implemented as a non-transitory computer-readable recording medium on which the program is recorded, such as a CD-ROM.

For example, when the present disclosure is implemented as a program (software), the steps are executed by using hardware resources such as the CPU of the computer, a memory, and an input/output circuit to execute the program. In other words, the steps are executed by the CPU, which obtains data from the memory or the input/output circuit to perform an arithmetic operation, and outputs the arithmetic result to the memory or the input/output circuit.

The components included in the vehicle approach notification system according to the above embodiment may be implemented as a dedicated or general-purpose circuit.

Alternatively, the components included in the vehicle approach notification system according to the above embodiment may be implemented as large scale integration (LSI), which is an integrated circuit (IC).

The integrated circuit is not limited to LSI, and may be implemented as a dedicated circuit or a general-purpose processor. A field programmable gate array (FPGA) which is programmable or a reconfigurable processor in which connections and settings of circuit cells inside the LSI are reconfigurable may be used.

Furthermore, when a LSI is replaced by a technique for forming an integrated circuit which appears as a result of progression of the semiconductor techniques or their derived techniques, naturally, the components included in the vehicle approach notification system may be formed into an integrated circuit using such a technique.

Besides, the present disclosure also covers embodiments obtained from the embodiments subjected to a variety of modifications conceived by persons skilled in the art, and embodiments obtained from any combination of the components and functions in the embodiments without departing from the gist of the present disclosure.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosure of the following patent application including specification, drawings, and claims are incorporated herein by reference in their entirety: Japanese Patent Application No. 2021-159521 filed on Sep. 29, 2021.

INDUSTRIAL APPLICABILITY

The present disclosure can be used in silent vehicles such as electric vehicles and hybrid vehicles.

The invention claimed is:

1. A vehicle approach notification system, comprising:
a processor;
a filter; and
a memory including at least one program that, when executed by the processor, causes the processor to perform operations, the operations including:
generating a signal corresponding to a notification sound for notifying of approaching of a vehicle, based on a sound signal obtained from notification-sound sound sources;
obtaining vehicle information of the vehicle; and
setting, according to the vehicle information, at least one of the notification-sound sound sources to be used in generation of the notification sound, a filter property to be applied to the filter, or a control parameter to be applied in generation of the notification sound,
wherein the vehicle information includes destination information of the vehicle,
the processor outputs the signal, through the filter, to an exterior loudspeaker provided to the vehicle,
the signal is generated based on the at least one of the notification-sound sound sources used in the generation of the notification sound, the filter property to be applied to the filter, or the control parameter to be applied in the generation of the notification sound when the notification sound is generated, according to the vehicle information including the destination information of the vehicle,
the vehicle approach notification system includes acoustic characteristics such that a signal or sound including at least two one-third octave bands is formed in a signal or sound transmission path from the notification-sound sound sources to a hearing position of the notification sound, and
sound pressure levels of the at least two one-third octave bands satisfy a constraint according to the destination information of the vehicle.

2. The vehicle approach notification system according to claim 1, wherein the operations further include:
generating a second signal corresponding to a sound effect to be output to an interior of the vehicle, based on the sound signal obtained from the notification-sound sound sources.

3. The vehicle approach notification system according to claim 2,
wherein the processor outputs the second signal, which is generated corresponding to the sound effect to be output to the interior of the vehicle, to an interior loudspeaker provided to the vehicle.

4. The vehicle approach notification system according to claim 2, further comprising:
an in-vehicle acoustic system including:
an amplifier which drives an audio loudspeaker provided to the vehicle; and
an external input receiver which receives an input of an external signal,
wherein the processor outputs the second signal, which is generated corresponding to the sound effect to be output to the interior of the vehicle, to the audio loudspeaker through the external input receiver in the in-vehicle acoustic system.

5. The vehicle approach notification system according to claim 1, wherein the operations further include:
generating a second signal corresponding to a sound effect to be output to an interior of the vehicle, based on a second sound signal obtained from a sound effect sound source which is different from the notification-sound sound sources.

6. The vehicle approach notification system according to claim 5,
wherein the processor generates the signal corresponding to the notification sound, based on the sound signal obtained from the notification-sound sound sources and the second sound signal obtained from the sound effect sound source.

7. The vehicle approach notification system according to claim 6,
wherein the processor generates the signal corresponding to the notification sound, based on an addition signal obtained by adding the sound signal obtained from the notification-sound sound sources and the second sound signal obtained from the sound effect sound source.

8. The vehicle approach notification system according to claim 5,
wherein at least one of the notification-sound sound sources or the sound effect sound source is rewritten.

9. The vehicle approach notification system according to claim 5,
wherein the sound effect sound source is stored in an external memory.

10. The vehicle approach notification system according to claim 1, wherein the constraint is that the sound pressure levels of the at least two one-third octave bands are at least equal to a predetermined overall level.

11. The vehicle approach notification system according to claim 1, wherein the constraint is that the sound pressure levels of four non-adjacent one-third octave bands are at least equal to a predetermined overall level.

12. The vehicle approach notification system according to claim 1, wherein the constraint is that a sum of the sound pressure levels of two non-adjacent one-third octave bands is at least equal to a predetermined overall level.

13. A vehicle approach notification system, comprising:
a processor; and
a memory including at least one program that, when executed by the processor, causes the processor to perform operations, the operations including:
generating a signal corresponding to a notification sound for notifying of approaching of a vehicle, based on a sound signal obtained from notification-sound sound sources;
obtaining vehicle information of the vehicle; and
outputting the signal, generated in the generating, to an exterior loudspeaker provided to the vehicle,
wherein the vehicle information includes destination information of the vehicle,
the signal is generated based on the notification-sound sound sources, which is set according to the vehicle information including the destination information of the vehicle,
the vehicle approach notification system includes acoustic characteristics such that a signal or sound including at least two one-third octave bands is formed in a signal or sound transmission path from the notification-sound sound sources to a hearing position of the notification sound, and
sound pressure levels of the at least two one-third octave bands satisfy a constraint according to the destination information of the vehicle.

14. The vehicle approach notification system according to claim 13, further comprising:
the exterior loudspeaker,
wherein the exterior loudspeaker includes the acoustic characteristics.

15. The vehicle approach notification system according to claim 13, further comprising:
the exterior loudspeaker; and
a resonator which is provided to the vehicle and through which the notification sound output from the exterior loudspeaker passes,
wherein the resonator includes the acoustic characteristics.

16. The vehicle approach notification system according to claim 13, further comprising:
a filter,
wherein the processor outputs the signal, generated in the generating, to the exterior loudspeaker through the filter, and
the signal or the sound, including the at least two one-third octave bands, passes through the filter.

17. The vehicle approach notification system according to claim 16,
wherein the filter is configured with a notch filter, a band elimination filter, or a band-pass filter.

18. The vehicle approach notification system according to claim 13,
wherein the sound signal, obtained from the notification-sound sound sources, includes a frequency band containing the at least two one-third octave bands.

19. A vehicle approach notification method, comprising:
obtaining vehicle information from a vehicle, the vehicle information including destination information of the vehicle;
setting, according to the vehicle information, at least one of notification-sound sound sources to be used in generation of a notification sound, a filter property to be applied to a filter, or a control parameter to be applied in generation of a signal corresponding to the notification sound, with the notification sound notifying of approaching of the vehicle;
generating, by a vehicle approach notification system, the signal corresponding to the notification sound, based on a sound signal obtained from at least one of the notification-sound sound sources used in the generation of the notification sound, the filter property to be applied to the filter, or the control parameter to be applied in the generation of the signal corresponding to the notification sound when the notification sound is generated, according to the vehicle information including the destination information of the vehicle; and
outputting, by the vehicle approach notification system, the signal, generated in the generating, through the filter to an exterior loudspeaker provided to the vehicle,
wherein the vehicle approach notification system includes acoustic characteristics such that a signal or sound including at least two one-third octave bands is formed in a signal or sound transmission path from the notification-sound sound sources to a hearing position of the notification sound, and
sound pressure levels of the at least two one-third octave bands satisfy a constraint according to the destination information of the vehicle.

* * * * *